United States Patent
Mayer

(10) Patent No.: US 7,076,418 B1
(45) Date of Patent: Jul. 11, 2006

(54) METHOD AND DEVICE FOR SYSTEM SIMULATION OF MICROCONTROLLERS/MICROPROCESSORS AND CORRESPONDING PERIPHERAL MODULES

(75) Inventor: Albrecht Mayer, Deisenhofen (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/530,549

(22) PCT Filed: Sep. 2, 1999

(86) PCT No.: PCT/DE99/02778

§ 371 (c)(1),
(2), (4) Date: Jun. 30, 2000

(87) PCT Pub. No.: WO00/14639

PCT Pub. Date: Mar. 16, 2000

(30) Foreign Application Priority Data

Sep. 2, 1998 (DE) .................... 198 40 033

(51) Int. Cl.
*G06F 9/45* (2006.01)
(52) U.S. Cl. .................... 703/22; 703/16; 703/17
(58) Field of Classification Search ............ 703/22, 703/14, 24
See application file for complete search history.

(56) References Cited

U.S. PATENT DOCUMENTS

| | | | | |
|---|---|---|---|---|
| 4,031,517 A | * | 6/1977 | Hirtle ................... | 703/24 |
| 5,546,562 A | | 8/1996 | Patel | |
| 5,663,900 A | | 9/1997 | Bhandari et al. | |
| 5,680,542 A | * | 10/1997 | Mulchandani et al. ....... | 714/28 |
| 5,680,584 A | * | 10/1997 | Herdeg et al. ............. | 703/22 |
| 5,689,684 A | * | 11/1997 | Mulchandani et al. ....... | 703/23 |
| 5,692,161 A | | 11/1997 | Basset et al. | |
| 5,870,588 A | * | 2/1999 | Rompaey et al. ........... | 703/13 |
| 5,960,188 A | * | 9/1999 | Linke et al. .............. | 703/14 |
| 6,014,512 A | * | 1/2000 | Mohamed et al. .......... | 703/27 |
| 6,047,387 A | * | 4/2000 | Chang et al. ............. | 714/33 |
| 6,223,144 B1 | * | 4/2001 | Barnett et al. ........... | 703/22 |
| 6,324,495 B1 | * | 11/2001 | Steinman ................ | 703/17 |

FOREIGN PATENT DOCUMENTS

| | | |
|---|---|---|
| EP | 0 270 983 | 6/1988 |
| EP | 0 777 180 | 6/1997 |

OTHER PUBLICATIONS

H. Hsieh, L. Lavagno, C. Passerone, "Modeling microcontroller periperals for high-level co-simulation and synthesis", IEEE 1997, pp. 127-130.*

Carl E. Wick, "Teaching Embedded Computer Systems with a Windows-Based Simulator", IEEE 1996, pp. 242-245.*

J-P Soininen, T. Huttunen, K. Tiensyrja, H. Heusala, "Cosimulation of Real-Time Control Systems" IEEE 1995, pp. 170-175.*

* cited by examiner

Primary Examiner—Paul L. Rodriguez
Assistant Examiner—Dwin M. Craig
(74) Attorney, Agent, or Firm—Schiff Hardin LLP

(57) ABSTRACT

A method for system simulation, which is distinguished by a first sequence of steps for simulating a microcontroller/microprocessor and peripheral modules using predetermined signal patterns and by a second sequence of steps for interrogating and evaluating system states that are brought about by the simulation. In order to carry out the second sequence, the first sequence is interrupted as dictated by markers that have been inserted into the first sequence, and the second sequence is executed in an accelerated operational mode that has been adapted to the evaluation.

13 Claims, 2 Drawing Sheets

METHOD AND DEVICE FOR SYSTEM SIMULATION OF MICROCONTROLLERS/MICROPROCESSORS AND CORRESPONDING PERIPHERAL MODULES

BACKGROUND OF THE INVENTION

The present invention relates to a method for simulation and to a device for carrying out the method.

Simulations of computer modules serve the optimizing of the system architecture of a computer, the development of suitable software, and the early detection of errors before the hardware is actually realized. In this way significant savings can be gained in the development process.

The pattern of a system should be understood as the arrangement of a microcontroller with peripheral modules and an external environment. The microcontroller specifically is the pure central processing unit (CPU). But microcontroller chips generally also have peripheral modules on the chip as well. Peripheral modules can have a wide variety of tasks; for instance, analog to digital converters (ADC), counters, serial interfaces, and so on. In this regard, peripheral modules are always hardware modules.

If, for example, a peripheral module is being developed for a microcontroller, this module is simulated with typical signal patterns, and is configured and controlled by the preferably also simulated microprocessor. The simulated states of the module are interrogated and evaluated by the microprocessor. Since the simulations have a precise clock cycle, all modules are always cosimulated when the microcontroller evaluates the states of the peripheral module. This evaluation can prolong the simulation time considerably.

However, particularly in the case when several modules are simulated at the same time, the total run can require a relatively long period of time, especially since the simulation of all modules always continues, even when the states of one module are being evaluated, owing to the unified processor clock.

Hitherto, the prolonged simulation time was accepted into the bargain, or the evaluation of the peripheral states was reduced to a minimum or was not done during the system simulation.

European Patent Application No. 0 777 180 already teaches a method for simulating and emulating systems, consisting of software and (simulated) hardware components. The method provides the possibility of interaction between the hardware and software components while at the same time the two systems are largely decoupled.

The basic idea of this method is to let the clocks of the components run independently and to synchronize them only at those points at which an interaction between the systems occurs, and only for the strictly necessary number of cycles. (Note: the term "clock of a component" is used in the sense of the clock that measures the simulated time). The real time is of course equal for all component simulations. To clarify the difference: One second of simulated time can last an hour in real time, for example.

The advantage of this method is that a rapidly simulatable system component is not slowed down by a slow one. This is of course also true when the interaction between the components is small. On the other hand, when the two clocks are rigidly synchronized, then the speed of simulation can never be higher than that of the slowest comonents.

The disadvantage of the method is that it cannot be tolerated in many system simulations that the clocks of the components do not have absolute synchronization. In addition to this, simulation runs cannot be fully reproduced, since the relative position of the clocks of the subcomponents are influenced, for instance by the loading of the simulation computer.

SUMMARY OF THE INVENTION

It is thus the object of the invention to set forth a method and a device of the above mentioned type with which the overall simulation run can be significantly accelerated.

For the method, this object is inventively achieved in accordance with the present invention in that a first sequence of steps is provided for simulating the module with predetermined signal patterns, and a second sequence of steps is provided for interrogating and evaluating system states that are induced by the simulation, whereby the first sequence is interrupted for the purpose of executing the second sequence as dictated by markers that have been inserted into the first sequence, and the second sequence is executed in an accelerated operational mode that has been adapted to the evaluation.

During the normal simulation, the microcontroller and the peripheral module are simulated with a precise clock cycle, whereas in the accelerated code execution, precise "simulated" time does not elapse; that is, the program part is processed in a kind of instruction set simulator.

The accelerated operational mode or code execution, should be understood as meaning that only a small part of the system is simulated/executed, and even that in a partly simplified form. An example is that only the CPU processes program code as instruction set simulator, and the rest of the system is not simulated. An example of a peripheral module is a serial interface, which files data in the output buffer directly in the memory for the simulation evaluation. In the case of the non-accelerated operational mode, over several clock cycles the serial interface would convert the data bit by bit into an output signal, which would then be received bit by bit by a receiver, assembled, and filed in the memory.

In an embodiment it is provided that certain peripheral modules are also cosimulated purely functionally during the accelerated code execution.

In an embodiment, there is provided a method for system simulation with simulated microcontrollers/microprocessors and appertaining peripheral modules, said method comprising the steps of:
  in a first sequence of steps, simulating said
    microcontroller/microprocessor and said peripheral
    modules with predetermined signal patterns, said
    first sequence of steps having markers inserted
    therein;
  in a second sequence of steps, interrogating and evaluating system states brought about by said simulation; and
  interrupting said first sequence of steps for executing said
    second sequence of steps as dictated by said markers
    that have been inserted into said first sequence, said
    second sequence of steps being executed in an accelerated operational mode that is adapted to said evaluation.

For the system for carrying out the method, the object is achieved in accordance with the present invention in that a microprocessor control unit is provided for simulating the module by generating clock-cycle-based signal patterns and for interrogating and evaluating the system states brought about by the simulation during a program interruption by activating an instruction set simulator.

In an embodiment, there is provided a system for carrying out a method for system simulation with simulated microcontrollers/microprocessors and appertaining peripheral modules, said method comprising the steps of:

in a first sequence of steps, simulating said microcontroller/microprocessor and said peripheral modules with predetermined signal patterns, said first sequence of steps having markers inserted therein;

in a second sequence of steps, interrogating and evaluating states of said system brought about by said simulation; and interrupting said first sequence of steps for executing said second sequence of steps as dictated by said markers inserted into said first sequence, said second sequence of steps being executed in an accelerated operational mode that is adapted to said evaluation;

said system comprising:

a microprocessor control unit for simulating a module by generating signal patterns with an essentially precise clock cycle and for interrogating and evaluating states of said module that are brought about by said simulation during a program interrupt by activating an instruction set simulator.

A particular advantage of these solutions is that an appreciable reduction of the time required for the overall run can be achieved by separating the actual system simulation from the evaluation of the simulation results, since in the evaluation phase the processor is not loaded with the then superfluous simulation processes, and on the other hand the evaluation itself runs faster due to the accelerated operational mode.

Further advantages consist in the ability of the program to monitor and test the states of the peripheral module comprehensively. It is not necessary to keep an additional external evaluation program current. Beyond this, the evaluation can be completely prevented from influencing the time characteristic of the program.

Beyond this, a critical advantage consists in the ability to use the program that was designed for the system simulation and for the simulated microcontroller for the actually realized microcontroller—that is to say, the one cast in silicon—following the removal of the provided markers.

In summary, the present invention for simulating computer modules essentially consists in the dividing of the system simulation into two subsimulations from the standpoint of the microcontroller or the microprocessor: on one hand, the actual system simulation; that is, the simulation of the peripheral module, which is simulated with typical signal patterns; and on the other hand, the simulation of the microcontroller. The second subsimulation relates to the evaluation of interrogated system states. When the evaluation phase is accelerated by the proposed method, not only does the simulated time characteristic become more precise, but the total simulation time is also reduced significantly.

These and other features of the invention(s) will become clearer with reference to the following detailed description of the presently preferred embodiments and accompanied drawings.

DETAILED DESCRIPTION OF THE PRESENTLY PREFERRED EMBODIMENTS

The inventive method is detailed below with the aid of an exemplifying embodiment.

In the simulation model of the 8051 microcontroller it is assumed that the inventive method has been implemented. For example, the assembler code for the simulation model of the 8051 microcontroller can read as follows:

. . . (program code) . . .
db 0a5h, "1+"; ****start lightspeed mode
mov sbuf, #"H"; visible in the console window
mov sbuf, #"i"
mov sbuf, #"!"
db 0a5h, "1−"; ****end lightspeed mode
mov sbuf, #"H"; visible on the internal bus, but not in the console window
. . . (program code)

The program code is directly processed between the markers without the simulation model requiring clock pulse edges. The thus processed program code is located before the markers and after the markers and is indicated above solely by dots ( . . . ). The opcode a5h, which is not ordinarily used, with the subsequent ASCII characters "1+" and "1−" for starting or stopping the second sequence of steps can be used as markers. Suitable opcode sequences can also be used. The second sequence of steps is referred to below as "lightspeed".

During this second sequence of steps, the serial interface of the simulation model of the 8051 microcontroller is simulated in that all outputs by the simulation model on its register SBUF are written directly onto the console window.

Figure 1:
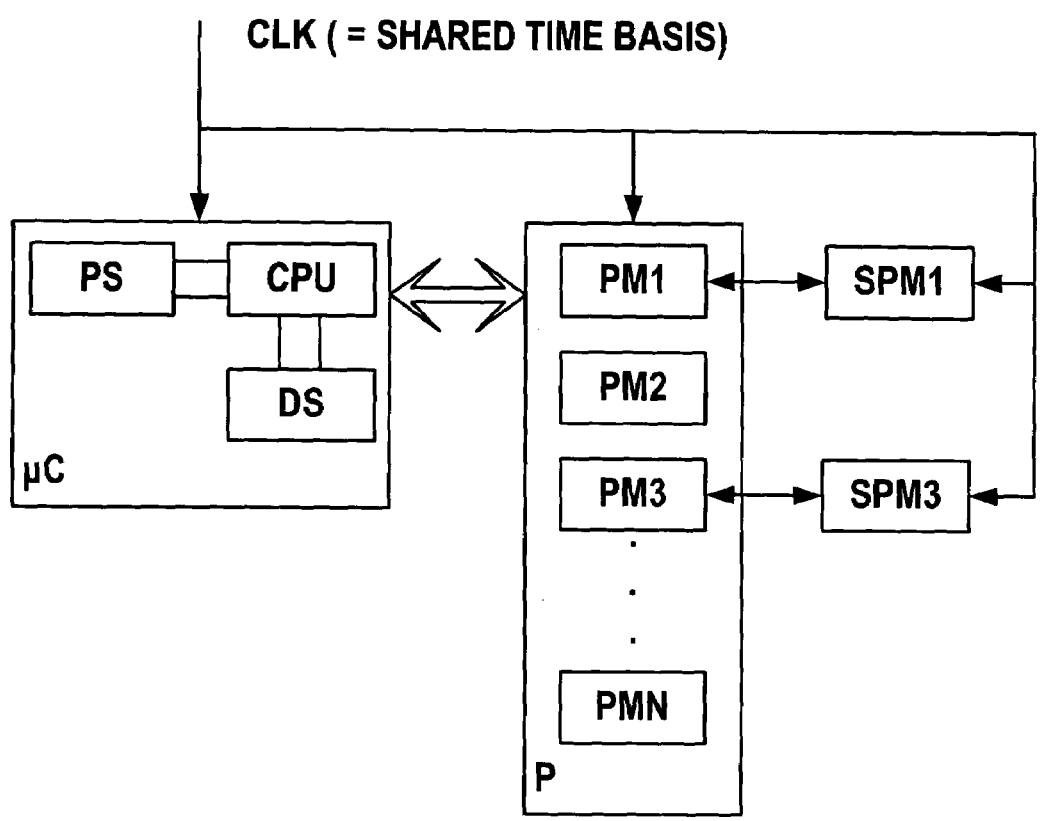
FIG. 1 is a block circuit diagram of an arrangement for overall system simulation according to the present invention.

FIG. 1 shows a block circuit diagram for an arrangement for overall system simulation according to the present invention. The block circuit diagram shows the core of a microprocessor μC, which contains a CPU unit, a program memory PS, and a data storage unit DS; the microprocessor μC stands in connection with a peripheral unit P comprising several peripheral modules PM1, PM2, PM3 to PMn. In addition, two blocks are represented for the simulated environment of the peripheral module PM1 and of the peripheral module PM3. The blocks are referenced SPM1 and SPM3. The block SPM1 could be a simulated sine generator, for example. The block referenced SPM3 could be a simulated console. An analog/digital converter can be provided as peripheral module PM1; a counter, as peripheral module PM2; and a serial interface, as peripheral module PM3. All components—that is, the microprocessor μC, the peripheral modules PM1 to Pmn, and the simulated environments for the peripheral modules—stand in connection to each other with a common time base clk, that is to say, with a common clock.

In an arrangement such as this, a system simulation could look as follows: The peripheral module PM1—i.e. an analog/digital converter, for example—measures the voltage of the simulated sine generator and triggers an interrupt after each measurement. The CPU then reads the value from the result register of the analog/digital converter and writes it into the data storage unit DS. After a certain number of measurements, the CPU switches into the accelerated mode and evaluates the measurements. After completing this, it switches back into the normal module, and the simulation continues at precisely the point at which the changeover occurred. The system simulation is therefore completely unaffected by the evaluation.

Figure 2:
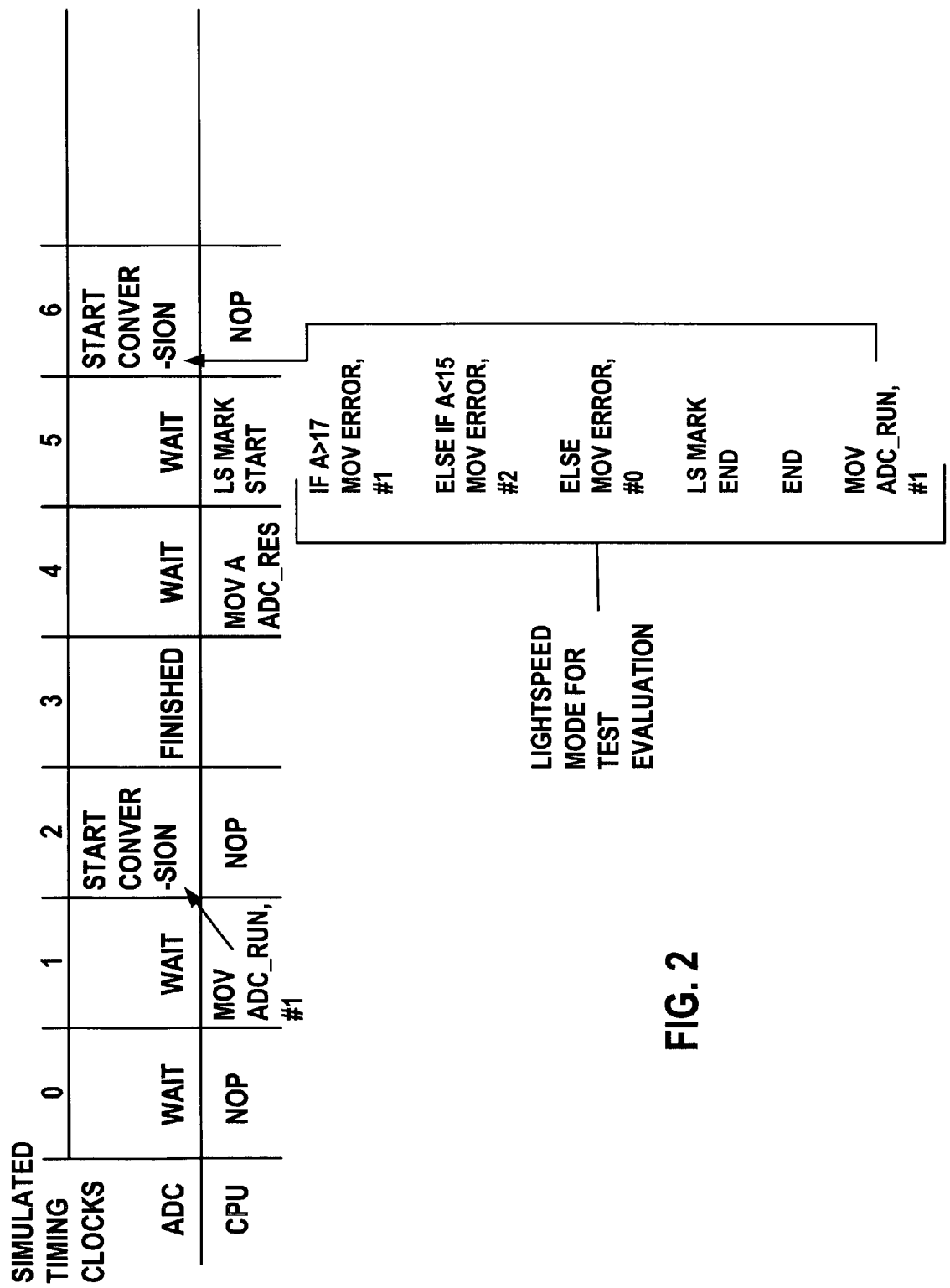
FIG. 2 shows an excerpt of steps of a CPU that are operated in accordance with the present inventive method.

FIG. 2 shows the status of the analog/digital converter (ADC) and the CPU or their instructions, charted over simulated time cycles 0 to 6. The CPU accordingly starts an ADC conversion and copies the result into memory. In the lightspeed mode, for the purpose of the test evaluation it is tested whether the expected value 16±1 was measured. This test is without influence on the overall system simulation, since the conversion 2 is started without delay.

In the present inventive method, the "clocks of all subcomponents" are basically rigidly coupled and run synchronously. The sole exception is what is known as lightspeed mode, in which the clock of the hardware components is quiescent though the software still runs on the CPU. Before the software accesses the hardware, the lightspeed mode must be explicitly exited, which is triggered by special markers that are otherwise not present in the program.

The basis for the two different modes in the present inventive method is the ability to monitor the clock of all subcomponents completely. This can be advantageously utilized for two applications:

1. On the simulated CPU, test programs can be executed without simulated time expiring and thus without influencing the system simulation itself.
2. The simulation can be accelerated when the software runs only on the CPU without the clock of the hardware components continuing to run.

Unlike the known methods, the present inventive method is deterministic and reproducible.

Although modifications and changes may be suggested by those of ordinary skill in the art, it is the intention of the inventors to embody within the patent warranted hereon all changes and modifications as reasonably and properly come within the scope of their contribution to the art.

I claim:

1. A method for simulating a system which comprises a core in a microprocessor or in a microcontroller and peripheral modules connected to the core, the method comprising:
    executing a first series of method steps for simulating the system using predetermined signal patterns; and
    executing a second series of method steps by the core of the microprocessor or of the microcontroller only in order to request and evaluate system states brought about by the execution of the first series of method steps, the execution of the first series of method stops being interrupted by the execution of the second series of method steps as stipulated by markers inserted into the first series of method steps, the second series of method steps being executed in an accelerated operating mode which is matched to the evaluation.

2. The method according to claim 1, wherein the first series of method steps is executed such that the core and the peripheral modules are simulated on a clock cycle basis.

3. The method according to claim 2, wherein the first series of method steps is a succession of successive program codes.

4. The method according to claim 3, wherein the markers are formed by opcodes or opcode sequences which are normally not used in the program code.

5. The method according to claim 3, wherein, during the second series of method steps, prescribed peripheral modules have their functions simulated at the same time.

6. The method according to claim 1, wherein the first series of method steps is a succession of successive program codes.

7. The method according to claim 6, wherein the markers are formed by opcodes or opcode sequences which are normally not used in the program code.

8. The method according to claim 7, wherein, during the second series of method steps, prescribed peripheral modules have their functions simulated at the same time.

9. The method according to claim 1, wherein, during the second series of method steps, prescribed peripheral modules have their functions simulated at the same time.

10. The method according to claim 6, wherein, during the second series of method steps, prescribed peripheral modules have their functions simulated at the same time.

11. The method according to claim 2, wherein, during the second series of method steps, prescribed peripheral modules have their functions simulated at the same time.

12. The method according to claim 1, wherein, during the second series of method steps, prescribed peripheral modules have their functions simulated at the same time.

13. An apparatus for simulating a system which comprises a core in a microprocessor or in a microcontroller and peripheral modules connected to the core, in which the system executes a first series of method steps for simulating the system using predetermined signal patterns; and executes a second series of method steps by the core of the microprocessor or of the microcontroller in order to request and evaluate system states brought about by the execution of the first series of method steps, the execution of the first series of method stops being interrupted by the execution of the second series of method steps as stipulated by markers inserted into the first series of method steps, the second series of method steps being executed in an accelerated operating mode which is matched to the evaluation; the apparatus comprising:
    a control unit for simulating the system by producing signal patterns which fundamentally have clock cycle accuracy and for requesting and for evaluating the system states brought about by the simulation during a program interruption by activating an instruction set simulator.

* * * * *